July 24, 1962 I. MOLNAR 3,046,349
STATION IDENTIFICATION APPARATUS
Filed April 27, 1959
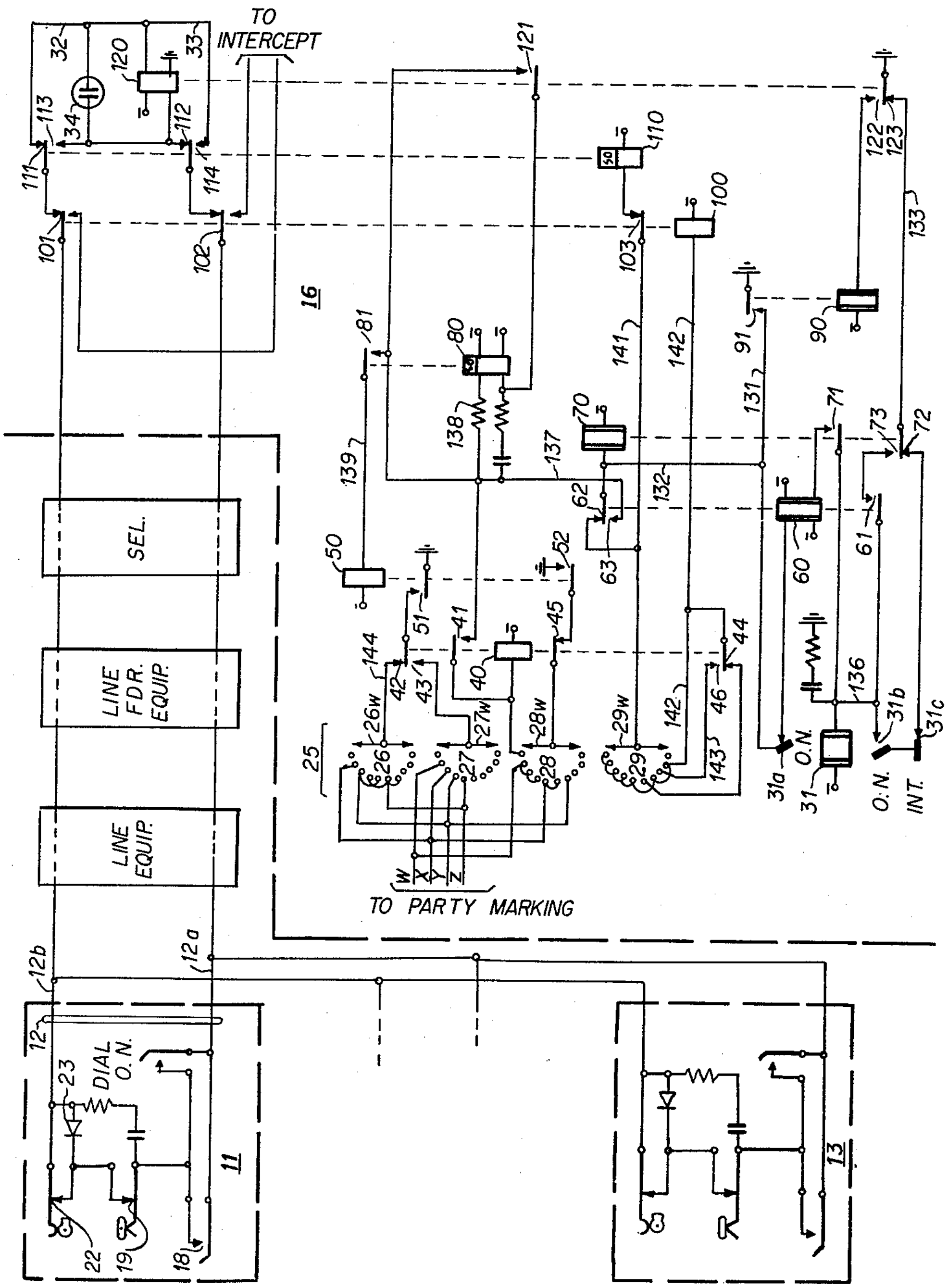
INVENTOR.
Imre Molnar
BY C. A. Gulbrandsen
Atty.

3,046,349

STATION IDENTIFICATION APPARATUS

Imre Molnar, Chicago, Ill., assignor to Automatic Electric Laboratories, Inc., a corporation of Delaware Filed Apr. 27, 1959, Ser. No. 809,278
14 Claims. (Cl. 179—17)

The present invention pertains to automatic telephone systems, particularly to a means, not dependent upon substation ground for identification of stations on a party line.

In the past, it has been the practice to establish a ground connection at the substation and to send a ground pulse out over the line at a preselected point in the dialing of a station identification digit to indicate the calling station on a party line. This method is not always dependable due to the variation of ground conditions and, in some rural areas, the difficulty of establishing an adequate ground at the substation. The method of sending a pulse, which must be very accurately spaced relative to the regular pulses, also poses a problem of very delicate timing in the pulsing mechanism.

Accordingly, it is a primary object of this invention to provide a station identification means for party lines which is not dependent upon substation ground.

Another object of this invention is to provide means operated by central office equipment for indicating a calling station on a party line.

Another object of the invention is to provide each station on a party line with means conditioned by completion of the line loop to the ticketer to put central office ground over the line loop following a preselected pulse in the dialing of a station identification digit.

Another object of this invention is to provide a telephone system with station identification means controlled by the interruption of the line loop for a predetermined period.

Still another object of this invention is to provide each station on a party line with an identification cam means on the dial shaft, identification contacts operated by the cam means, and a unidirectional conductor for shunting the identification contacts out of the loop circuit during a preselected portion of the dialing cycle.

These and other objects of the invention will be apparent to one skilled in the art from the following detailed description when taken in conjunction with the drawing, which is a schematic representation of a telephone system embodying the invention.

This invention is intended to be used in an automatic toll ticketing telephone system wherein the calling party dials an access number, the last digit of which is 0, to transmit station identification indicia to a register in the system.

An example of a system in which the present invention may be used is described in detail in a copending U.S. patent application, Serial No. 628,474, filed December 3, 1956, by John E. Ostline et al. which application is made a part hereof by reference.

In general operation of the system, the calling station on a party line initiates a call and actuates line equipment to extend a line loop to a selector. Upon getting dial tone, the calling station subscriber operates a pulse generating means to dial an access code comprising one or two preselected digits and a zero (0). The dialing of the first digit or digits extends the call to a ticketer or register in the central office which reverses the flow of current in the line loop and conditions an identification circuit for operation in response to the last digit of the access code for identifying the calling station on a party line.

For purposes of this specification, a pulse is a sudden change of brief duration produced in a current or voltage of a circuit in order to actuate or control a switch or relay. A typical dial pulse in telephony is produced by opening the loop circuit for a period of approximately sixty milliseconds. Where pulses are generated in a series, such as the ten pulses generated by the dialing of zero, the sixty millisecond open periods are separated by closed periods of approximately forty milliseconds.

In accordance with this invention, the pulse generating means comprises the conventional pair of impulse springs in the line loop adapted to be opened by an impulse cam having a plurality of regular projectors thereon to transmit a series of regular pulses through the line loop at regular intervals in accordance with the movement of a dial; and a pair of spotter springs in the line loop with a unidirectional conductor in shunt relationship therewith. Party identification is accomplished by opening the line loop other than at the dial springs at a predetermined point in the period of ten pulses generated by the dialing of zero. A different predetermined point of interruption of the ten normal dial pulses is assigned to each station on a party line so that the registration at the point of interruption identifies the calling party.

In practicing the invention, the spotter springs are adapted to be opened by spotter cam means positioned on the dial shaft in a predetermined position relative to the impulse cam, the position to be determined by the particular station to be identified. During regular dialing, the opening of the spotter springs does not affect the line loop due to the alternate path through the unidirectional conductor. Upon accessing the ticketer and the attendant reversal of current in the line loop, the opening of the spotter contacts during the dialing of the identification of the digit interrupts the line loop at a predetermined point indicative of the calling station to actuate an identifying circuit to identify the calling station.

Referring now to the drawing, the system embodying the invention includes a substation 11 on a party line 12 with a plurality of other stations, indicated generally at 13, switch-through equipment indicated at 14, a ticketer 16, which includes an identification circuit.

Each substation 11 includes a conventional hookswitch 18 for completing a line loop upon lifting of the substation receiver; impulse springs 19 operated by the rotation of a dial to generate pulses in the line loop; and spotter contacts 22 connected in one side of the line in parallel with a unidirectional conductor or rectifier 23.

The switch train between the calling line and the ticketer or other central office equipment includes, as is shown in the drawing, line equipment, line finder equipment, and selector means to extend the line loop to a relay 120 in the ticketer upon dialing the access code. During extension of the call through the switchtrain, the flow of current is from battery (not shown) through the conductor 12*a* of the line loop through the hookswitch 18, the dial springs 19, either the spotter springs 22 or the rectifier 23, and the conductor 12*b* to ground (not shown). Upon accessing the ticketer, the direction of flow of current is reversed so as to render the rectifier 23 non-conducting to thereby remove the alternate path around the spotter contacts 22.

The identification circuit in the ticketer which is adapted to be stepped by the pulsing relay 120 during the dialing of "0" of the access code includes a stepping switch 25 having three marking levels 26, 27, and 28 with their terminals selectively connected to the WXYZ wires of a detector register, and a monitor level 29 adapted to actuate intercept functions in the event of the dialing of some number other than "0." The switch 25 is stepped by a motor magnet 31 in response to the operation of the relay 120, and the relays 40, 50, 60, 70, 80, 90, 100, and 110 of the identification circuit perform various functions which are set forth in detail in the following description.

Upon extension of the line loop to the ticketer, the flow of current in the loop is reversed and flows from battery through the upper windings of the relay 120, the conductor 32, the contact 111, the contact 101, the conductor 12*b* of the line 12, the spotter springs 22, the dial springs 19, the hookswitch 18, the conductor 12*a*, the contacts 102 and 112, and through the lower winding of relay 120 to ground. A neon lamp 34 is connected across the loop circuit to serve as a peak voltage limiter. Due to the reversal of the flow of current in the line loop, and the conducting characteristics of the rectifier 23, current no longer flows through the rectifier 23 but only through the contacts 22.

As long as the spotter contacts 22 remain closed, the relay 120 is operated over the line loop in the normal manner. Upon access, the relay 120 is operated through the line loop, to close its make contact 121 and its make contact 122 to operate the battery connected relay 90 from ground through the contact 122. Operation of the relay 90, a slow-to-release relay, operates the contacts of the battery connected relays 60 and 70. The operate path for the relay 70 is from ground through the make contact 91 of the relay 90, through the conductors 131 and 132. Relay 90, at contact 91, also extends an operating circuit for relay 110 over break contacts 62 and 103. Relay 110, however, is slow-to-operate and therefore does not immediately operate its contacts. A path is prepared to relay 60 to supply intermittent holding ground thereto upon operation of the relay 70 through the make contacts 71 and 73. The relay 60 is initially operated upon operation of the relay 90 by ground through the make contacts 91 conductor 131, the off-normal contact 31*a* to the battery-connected upper windings of the relay 60. Upon operation, the relay 60 closes its make contact 61 to prepare an operate path to a motor magnet 31 on the switch 25. The relay 60, upon operation, also operates its make contact 63 to open the operating path to the relay 110 which, due to its slow-to-operate characteristics, has not operated its contacts. The relay 60 completes an operating path to the upper winding of the differentially wound relay 80 through a conductor 137 and resistor 138 and to the lower winding of relay 80 over contacts 121.

The relay 120 is operated as a conventional line relay being energized when the line loop is closed and deenergized when the line loop is interrupted. A first pulse generated by the opening of the dial springs 19 in the line loop, causes the relay 120 to restore its contacts thereby opening the circuit to the lower windings of the relay 80 at the make contact 121, temporarily removes ground from the relay 90 at its make contacts 122 and closes contact 123 to extend ground over the contacts 73 and 61 to energize the motor magnet 31. Holding ground is supplied at the same time to the relay 60 through the path prepared by the operation of the relay 70. Upon closing of the dial contacts 19, the relay 120 is once again energized to operate its make contact 121 to recharge the lower coil of the relay 80 and to open contact 123 and close contact 122 to remove operating ground from motor magnet 31 causing it to release and step the wipers 26*w*, 27*w*, 28*w*, and 29*w* of the switch 25 one step. The initial step of the switch also opens the off-normal contact 31*a* and closes the off-normal contact 31*b* to remove operating ground from the upper winding of the relay 60 and prepare a self-interrupted homing circuit for operation of the switch 25 upon release of the identification circuit. The interrupter spring 31*c* is opened upon each energization of the motor magnet 31, but because of the alternate path through the contacts 73 and 61, does not affect the operation of the magnet 31 during this portion of its operation.

With each subsequent pulse, the motor magnet is energized and released to operate the stepping switch one increment. At a predetermined time in the pulsing cycle which is different for each station on a party line, the spotter contacts are opened by a cam on the dial shaft to interrupt the line loop for two closed periods of the dial springs and three open periods (approximately 260 milliseconds). During the period that the loop is kept open, the make contact 121 is open, thereby removing the opposing ground from the lower winding of relay 80 and permitting operation thereof by its upper winding. The operating path for the upper winding of the relay 80 is from ground through the make contact 91, the conductor 131, the conductor 132, the make contact 63 of the relay 60, still operated, the conductor 137 to battery through the upper winding of the relay 80 and a resistor 138.

Operation of the relay 80 closes its make contact 81 and extends ground through a conductor 139 to operate a battery-connected relay 50. On operation of the relay 50, the make contacts 51 and 52 extend ground through the wipers 26*w* and 28*w*, and in accordance with the position of the wipers, to the WXYZ lines of the party marking mechanism to identify the party in accordance with the position of the spotter cam.

In order to accommodate ten parties, it is necessary to utilize two spotter cams for four of the parties. The open periods of the detector loop, expressed in terms of the dial pulses, are set out in the table below. As indicated in the table, the open periods for parties 7, 8, 9, and 0 are complemented by a first open period following the first pulse.

| Station: | Spot location (closed period) | |
|---|---|---|
| 1 | 3–4 | |
| 2 | 4–5 | |
| 3 | 5–6 | |
| 4 | 6–7 | |
| 5 | 7–8 | |
| 6 | 8–9 | |
| 7 | 5–6 | 2–3 |
| 8 | 6–7 | 2–3 |
| 9 | 7–8 | 2–3 |
| 0 | 8–9 | 2–3 |

Assuming that the wipers of the switch 25 have been stepped once to advance to the first terminal, the ground pulse attendant upon the actuation of the relay 80 as described above is not transferred to the party marking lines, but is transmitted through the wiper 28*w* and the number 1 terminal on level 28 to the battery connected relay 40.

Upon actuation of the relay 40, a locking path is established through its make contacts 41 to the ground on the conductor 137. A make contact 43 is operated to transfer the ground path through the closed contact 51 to level 27 rather than level 26 of the switch 25. After the spotter cam passes and the contacts 22 are permitted to close, the remaining pulses are transmitted to the motor magnet 31 to step the wipers for the remaining pulses. Where the pulsing has been interrupted for two pulse periods, the wipers will come to rest on the eighth terminal, or in the case of interruption for four pulse periods the wipers will come to rest on the sixth terminal. In the case of levels 26, 27, and 28, the sixth, eighth, ninth, and tenth terminals are not wired and consequently have no effect on the operation of the circuit. The level 29, however, is the monitor level which prevents completion of the call when the calling party has not been properly identified—either through the dialing of a digit other than "0" or due to a missed pulse or mechanical failure of the stepping mechanism.

At the end of the dial cycle, the relay 60 drops out due to the absence of ground in its holding circuit when the contact 122 is held closed by the relay 120. Ground is brought to the wiper 29*w* and the battery connected relay 110 through the make contact 91, the conductor 131, the conductor 132, the break contacts 62 and 103, and the conductor 141. Due to its slow-to-operate characteristics, the relay 110 does not operate immediately.

The battery connected interceptor relay 100 is operated, in the event that the wiper 29*w* is not on the proper terminal at the end of the cycle, by ground which is extended by the wiper 29*w* through the multipled terminals and the conductor 142. Operation of the relay 100 closes the contacts 101 and 102 to extend the calling party to the intercept circuit and cause the calling party to be cut through to an intercept operator, and to interrupt the operating path for the relay 110 at the break contact 103.

In normal operation, the ground on the wiper 29w does not cause the relay 100 to be operated. In this case, the rectifier 23 is rendered conducting when relay 110 is operated to reverse the flow of current in the line loop by closing its contacts 113 and 114. This conditions the relay 120 to be utilized for any further functions without the inclusion of the spotter contacts 22.

Upon release of the detector circuit, the relay 120 releases and its contact 122 opens the operating path for the relays 70 and 90, and contact 123 prepares an operating path for the motor magnet 31 from ground through the contact 123, the contact 72 of the relay 70, upon release, the interrupter springs 31c, the off-normal contact 31b, and the conductor 136. This self-interrupting homing circuit causes the motor magnet to step its wipers, in a well-known manner, to their home position. Upon the wipers reaching their home position, the off-normal contact 31b is opened to open the homing circuit and the identification is conditioned for subsequent operation.

In operation, assume that the calling station is station number 3 on a party line and initiates a call. Upon lifting receiver, the hookswitch 18 is closed to complete a line loop with current flowing in a forward direction to render the rectifier 23 conducting to provide an alternate path around the spotter contacts 22. The first digit or digits of the access code are dialed to extend the call to the ticketer in the conventional manner. While the spotter cam on the dial shaft may open the spotter contacts 22 during this dialing, it does not affect the generation of the pulses because of the alternate circuit path provided by the rectifier 23. Upon seizure of the ticketer, the line relay 120 in the identification circuit is included in the loop and the battery is reversed so that the rectifier 23 becomes non-conducting and opening the contacts 22 interrupts the line loop. Party number 3 now dials the "0" and pulses the relay 120 four times before the spotter cam opens the spotter contacts 22. The four pulses operate and release the relay 120 to step the wipers of the switch 25 to the fourth terminal. At this point, the spotter cam on the dial shaft opens the spotter contacts 22 and holds the line loop open for two closed and three open periods of the normal pulse cycle. While the spotter contacts are open, the make contact 121 opens and removes ground from the lower winding of the relay 80 and permits operation thereof as described above to close the make contact 81 to operate the relay 50. Operation of the relay 50 closes the make contacts 51 extending ground through the unoperated contact 42 to the switch wiper 26w, and closes the make contact 52 to extend ground to the switch wiper 28w. The wipers 26w and 28w, being on the fourth terminal, which are connected to the Z and W wires, send ground pulses to the Z and W wires respectively, ZW having been assigned to the third party. As the spotter cam passes, the loop is once more closed and the relay 120 continues to operate the stepping mechanism to move the switch wipers four more times to the eighth terminal. The eighth terminal on switches 26, 27, and 28, being not wired, have no effect on the circuit. The ground potential which is extended to the switch wiper 29w as described above is extended to an operating path for relay 110 through the conductor 143. The path is opened at the contact 46 due to operation of relay 40 and has no effect.

The characteristics of the slow-to-release relays 60, 70, and 90 are such that relay 90 will remain operated for a longer period of time following the opening of the operating circuit than the relay 60 and 70. After the relay 60 releases to close its break contacts 62, and while the relay 90 is still operated, ground is extended through the contacts 91, 62, and 103 to the relay 110.

The ground potential on the conductor 141, after the release of the relay 60, is extended to operate the relay 110. Operation of the relay 110 closes the contacts 113 and 114 to reverse the battery in the line loop and prepare the relay 120 for further functions. The return of the switch 25 to prepare the detector circuit for subsequent operation is as described above.

For further operation, assume that station number eight is the calling party and has accessed the ticketer. The first spotter cam on the dial shaft interrupts the loop after one pulse so that the wipers are all on the first terminal during the open period. When the relay 50 operates as described above, relay 40 is operated by ground potential extended through the make contact 52 and the break contact 45 to the number 1 terminal on level 28 through the wiper 28w and thence to the battery connected relay 40. Upon operation of the relay 40, the contact 43 is closed to prepare a path from ground to the wiper 27w and contact 42 is opened to remove ground from wiper 26w. A locking circuit for the relay 40 is completed through the make contact 41 and ground potential is removed from the wiper 28w by opening the break contact 45. Opening the contact 44 opens the path from the sixth terminal of the switch 29 to relay 100, once contact 46 closes to prepare an operating path for relay 100 from the eighth terminal.

When the first spotter cam permits the spotter contacts 22 to close, the relay 120 is once more pulsed, the relays 80 and 50 are released, and the switches are stepped. Two more pulses, which are the fourth and fifth pulses, are transmitted over the line loop to step the wipers two more terminals, and during the sixth and seventh pulsing period the second spotter cam once more opens the line loop to permit the relays 80 and 50 to operate. Upon operation of the relay 50, ground is extended through the wiper 26w and the third terminal of the level 26 to put ground on the X wire to thereby mark the number eight party. After the "0" has been completely pulsed in the circuit, the wipers of the switch 25 will have advanced to the sixth terminal due to the loop having been opened for a total of four pulse periods. The wiper 29w, having ground extended thereto from the conductor 141, will extend the ground to an open circuit at the contact 44, thereby indicating proper function of the detector circuit, and, after a predetermined period of time, the slow-to-operate relay 110 operates from the ground present at the conductor 141 to perform the above-described reversal of battery in the line loop.

While the present invention has been described in a specific embodiment, it is, of course, understood that numerous changes may be made therein without departing from the spirit and scope of the invention.

What is claimed is:

1. In a telephone system including a party line, a register, and a plurality of subscriber stations on the party line, each station operable to complete a line loop having current flowing in a predetermined direction upon initiation of a call and dialing means operable to control a switch train to extend the line loop to the register, means conditioned by extension of the line loop to the register and operated by the dialing of a predetermined digit to identify the calling station comprising: wiper means advanced one increment for each pulse generated by said dial means; normally closed switch means in said line loop; means operated by said dial means for opening said switch for a predetermined period during the generation of a preselected series of impulses, said preselected series being different for each station on the party line; a unidirectional conductor connected in said line loop in parallel with said switch to render said switch ineffective to interrupt said line loop during the flow of current therein in said predetermined direction; and means actuated by the interruption of said line loop to mark the position of said wiper means at the beginning of said interrupted period.

2. In a telephone system having a party line including line equipment and a plurality of substations adapted to operate said line equipment to complete a line loop having current flowing in a predetermined direction upon initiation of a call therefrom, and means for opening and closing said line loop at measured intervals to generate a series of pulses therein in accordance with rotation of a dial, party identification means comprising: a switch train controlled by said pulse generating means to extend the line loop to an identification circuit; means actuated by extension of the line loop to said identification circuit for reversing the flow of current in said line loop; interrupting means conditioned by the reversal of current to open said line loop for a predetermined period; means actuated by a predetermined amount of rotation of said dial to actuate said conditioned interrupting means; and means actuated by the opening of said line loop for said predetermined period to register the number of pulses transmitted prior to interruption, said number of pulses being indicative of a particular calling station.

3. In an automatic telephone system including a plurality of party lines, each having a plurality of stations adapted to be connected through a line loop to central office equipment upon dialing an access code, each station including dial means for generating pulses in the line loop in accordance with the rotation thereof, station identification means comprising: a source of battery for inducing a forward flow of current in the line loop; normally closed switch means in the line loop adapted to be opened for a predetermined period of time by said dial during each pulse generating cycle; unidirectional conducting means connected in shunt with said switch during the forward flow of current in said line loop; means responsive to a predetermined number of impulses for reversing the flow of current in said line loop to render said unidirectional conducting means non-conducting; stepping means advanced one step for each pulse in a pulsing cycle; means controlled by said dial to open said switch for a predetermined period at a predetermined point in the pulsing cycle; and means conditioned by said pulsing cycle and actuated by the interruption thereof for a predetermined period for marking the position of said stepping means, whereby the calling station is identified.

4. In an automatic telephone system, means controlled by the dial of each subscriber station on a party line to select indicia peculiar to each station for identifying the station initiating the call, comprising: central office equipment; a line loop including the subscriber station and the central office equipment completed upon initiation of a call; battery means for supplying current in a first predetermined direction to said line loop; pulsing means for transmitting impulses over said line loop in response to movement of said dial; switch means in said line loop operable by movement of said dial; unidirectional conducting means connected in said line loop in parallel with said switch means for shunting out said switch means when said current is flowing in said first predetermined direction; means responsive to a predetermined series of impulses for reversing the flow of current in said line loop; means on said dial for opening said switch for a predetermined period of time at a predetermined point in the dialing cycle; and means responsive to the opening of said line loop for said predetermined period for registering indicia of the calling party.

5. In an automatic telephone system having a plurality of party line stations each including a line loop adapted to be completed to connect the station to central office equipment and a setting device variably rotatable from a returnable to a home position in accordance with a digital number for controlling pulse generating means in accordance with return of said setting device to generate a pulse in the line loop in a predetermined time sequence indicative of a selected number, means for identifying the calling party, comprising: switch means connected in the line loop in series with the pulse-generating means; a cam operable to open said switch at a predetermined point in the pulse-generating sequence; unidirectional conducting means connected in said line loop parallel to said switch, said conducting means shunting out said switch during forward flow of current in said line loop; stepping means operated in accordance with the pulses generated in said line loop; means conditioned by the first operation of said stepping means for registering the position of said stepping means; and means actuated by a predetermined period of interruption in said line loop to operate said conditioned registering means.

6. In a telephone system: a party line including a plurality of subscriber stations; switch means for completing a line loop, including one of said stations, upon initiation of a call; a source of energy to produce a flow of electric current in a forward direction in said line loop; a register; means in each station operable to open and close said line loop at measured intervals to generate a series of pulses therein in accordance with rotation of a dial; means controlled by said generated pulses to extend said line loop to said register; means in said register operated upon extension of the line loop thereto to reverse the flow of current in said line loop; means in said line loop controlled by said dial to interrupt said line loop for a predetermined period after a preselected pulse in each series generated by said dial, said preselected pulse being different for each station on said party line; unidirectional conducting means connected in said line loop in parallel with said interrupting means to render said interrupting means ineffective during the forward flcw of current in said line loop; wiper means in said ticketer adapted to be incrementally stepped by the series of pulses generated by said dialing means; a plurality of terminals engageable with said wiper means; marking means having an operating circuit including said terminals; and a source of current extended to said wiper means by the interruption of said line loop for said predetermined period of time to actuate said marking means in accordance with the terminal engaged with said wiper means whereby the calling station is identified.

7. In a telephone system including a party line, a register, and a plurality of subscriber stations on the party line each station operable to complete a line loop having current flowing in a forward direction upon initiation of a call and dialing means operable to control a switch train to extend the line loop to the register, means to identify the calling station comprising: wiper means conditioned by the extension of the line loop to the register to be advanced one increment for each pulse generated by said dialing means; normally closed switch means in said line loop; a unidirectional conductor connected in said line loop to provide a path for current only in said forward direction around said switch means; means operated by said dial means for opening said switch for a predetermined period during the generation of a preselected series of impulses, said preselected series being different for each station on the party line; means actuated by the extension of said line loop to said register to reverse the flow of current in said line loop thereby enabling said switch means to interrupt said line loop; means actuated by the interruption of said line loop for said predetermined period to mark the position of said wiper means; and intercept means actuated by the receipt of a number of pulses other than that of said predetermined digit.

8. In a telephone system including a party line, a register, and a plurality of subscriber stations on the party line, each station operable to complete a line loop having current flowing in a predetermined direction upon initiation of a call, and dialing means operable to control a switch train to extend the line loop to the register, means controlled by the dialing of a predetermined digit to identify the calling station comprising: means operated by the extension of the line loop to the register to reverse the flow of current in said line loop; wiper means conditioned by the extension of the line loop to the register to advance one increment for each pulse generated by said dial means; normally closed switch means in said line loop; means operated by said dial means for opening said switch for a predetermined period during the generation of a preselected series of impulses, said preselected series being different for each station on the party line; a unidirectional conductor connected in said line loop in parallel with said switch to conduct the flow of current in said line loop in said predetermined direction only, whereby said switch is rendered ineffective to interrupt said line loop during the flow of current in said predetermined direction; means actuated by the interruption of said line loop to mark the position of said wiper means; and means actuated by the receipt of the last impulse generated by the dialing of said predetermined digit for reversing the flow of current in said line loop to said predetermined direction.

9. In a telephone system, an arrangement for identifying calling stations on a party line, said arrangement comprising central office equipment connected to said line, a loop circuit extending over said line between said stations and said equipment, said stations individually comprising a calling device having impulse springs included in said loop circuit for transmitting series of impulses by alternately opening and closing said circuit, and having station identifying means operable to hold said loop circuit open for a prolonged interval independently of said impulse springs at a selectable point during the transmission of an impulse series; and said central office equipment comprising a calling station identification circuit effective when taken into use to return a signal over said line for conditioning said identifying means for operation during the transmission of a subsequent impulse series, said identification circuit including means operated under the control of said identifying means for registering the identity of said calling station in accordance with the point during said impulse series at which said loop circuit was held open for said prolonged interval.

10. The combination in a telephone system as claimed in claim 9 wherein said registering means includes a counting device advanced under the control of said impulses received over said line loop, and means responsive to said prolonged opening of said line loop for stopping the said advancement of said counting device at the aforementioned point during said impulse series.

11. The combination in a telephone system as claimed in claim 10 wherein said counting device comprises a rotary switch having a bank and cooperating wipers, and wherein said identification circuit includes means for applying markings in the form of a combinational code over said wipers and bank as identification of the calling station.

12. The combination in a telephone system as claimed in claim 9 wherein the identifying means at said station include identifying contact springs and cam means controlling said springs so as to hold said loop circuit open for a prolonged interval at a plurality of selectable points during the transmission of said impulse series; and wherein said identification circuit includes means operated when said loop circuit is thus held open at a first point of said impulse series for preparing said circuit for a registering operation at another point during said impulse series.

13. In a telephone system, an arrangement for identifying calling stations on a party line, said arrangement comprising central office equipment connected to said line, a loop circuit extending over said line between said stations and said equipment, said stations individually comprising: a rectifier included in said loop circuit, and a calling device having dial impulse springs included in said loop circuit, having station identifying springs and having cam means characteristic of the particular calling station for actuating said identifying springs, said rectifier being poled so as to render said identifying springs ineffective while said loop circuit has its normal direct current polarity; and said central office equipment including first means for supplying said loop with direct current of reverse polarity, said rectifier being responsive to said polarity reversal to effectively include said identifying springs in said loop circuit, and said central office equipment including second means thereafter operated over said loop circuit by said identifying springs under the control of said cam means for identifying the calling station on said line.

14. The combination in a telephone system as claimed in claim 13 wherein said rectifier is connected in parallel with said station identifying springs, and said parallel combination connected in series with said impulse springs.

References Cited in the file of this patent

UNITED STATES PATENTS

| | | |
|---|---|---|
| 2,524,773 | Deakin | Oct. 10, 1950 |
| 2,847,509 | Evers et al. | Aug. 12, 1958 |
| 2,945,095 | Skogsberg | July 12, 1960 |
| 2,976,366 | Terry | Mar. 21, 1961 |